June 19, 1951 — R. WEISS — 2,557,486

TWO-STAGE QUICK-CHANGING CHUCK

Filed Oct. 26, 1946 — 2 Sheets-Sheet 1

Inventor
R. Weiss

Inventor
R. Weiss

Patented June 19, 1951

2,557,486

UNITED STATES PATENT OFFICE 2,557,486

TWO-STAGE QUICK-CHANGING CHUCK

Robert Weiss, Zurich, Switzerland

Application October 26, 1946, Serial No. 705,959
In Switzerland October 30, 1945

4 Claims. (Cl. 279—71)

1

The present invention relates to a two-stage quick-changing chuck for machine tools, especially drilling machines, having clamping rollers mounted in a cage-shaped central carrier, being controlled by cam-like faces provided within a cylinder rotatable on the carrier and whose centers of curvature are non-coaxial with the rotary axis.

In order to enlarge the width of grip of such self-acting chucks, it has already been proposed to provide between the clamping bodies and the cam-like faces of the cylinder insertable and retractable intermediate pieces which permit increasing the radial path of the clamping bodies where there is the need of gripping especially thin or thick tool shafts. To control these intermediate pieces special curved grooves are provided which extend parallel with the clamping pressure-producing cam-like or curved faces. The insertion and retraction of these intermediate pieces is, however, rather intricate and the whole mechanism little reliable, so that such chucks do not meet the requirements of practice.

Now, the two-stage quick-changing chuck according to the invention is characterized in that the clamping rollers are stepped at some places so as to form radially projecting collars, and in that the curved faces are made with definite grooves to receive these collars; the cylinder with the curved faces being mounted displaceable in axial direction of the rollers so that in the one limit position of the path of axial displacement the rollers run with their great diameter on the curved faces and in the other limit position with their small diameter, whereby on the arched ends of the curved faces most remote from the rotary axis provision is made of control faces which, with the rollers running on their small diameter, project into the motion path of the roller collars and, in rising towards the curved faces run out in these to form a seat for the roller collars.

The accompanying drawing shows by way of example a preferred embodiment incorporating the invention.

Figure 1:
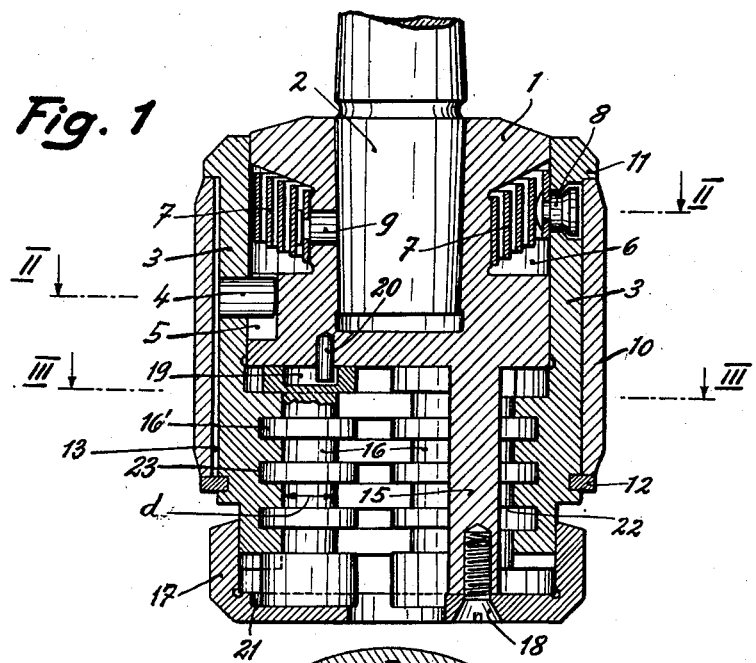
Figure 2:
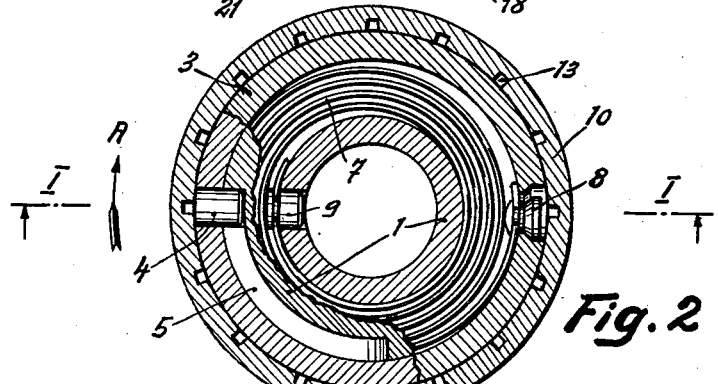
Figure 3:
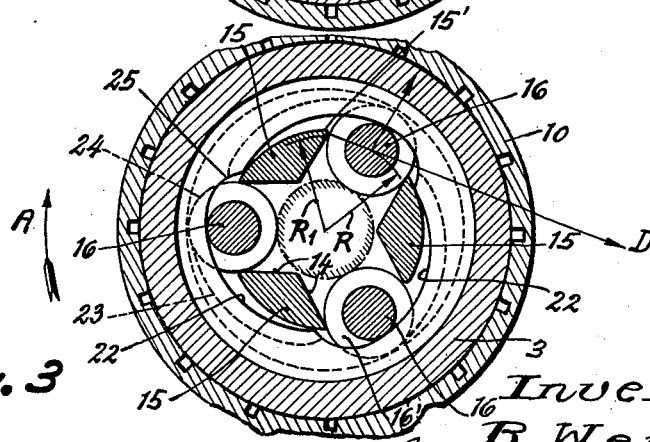
Figure 4:
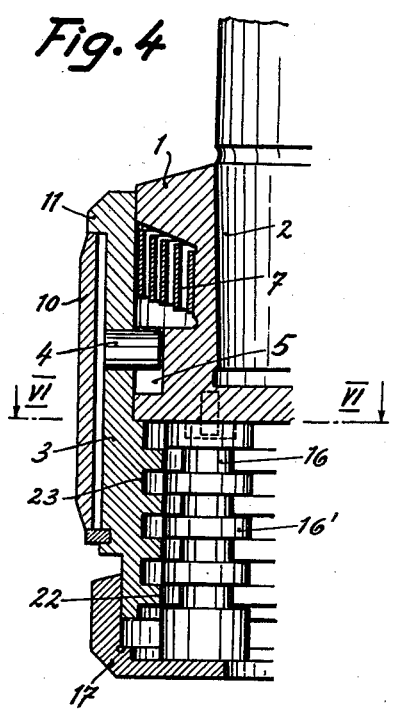
Figure 5:
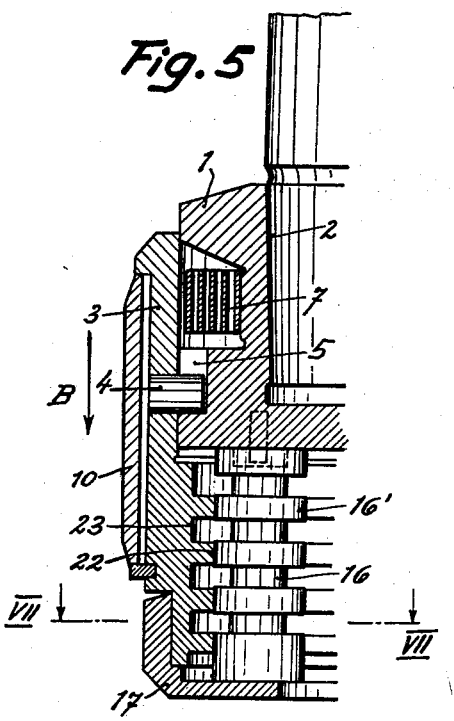
Figure 6:
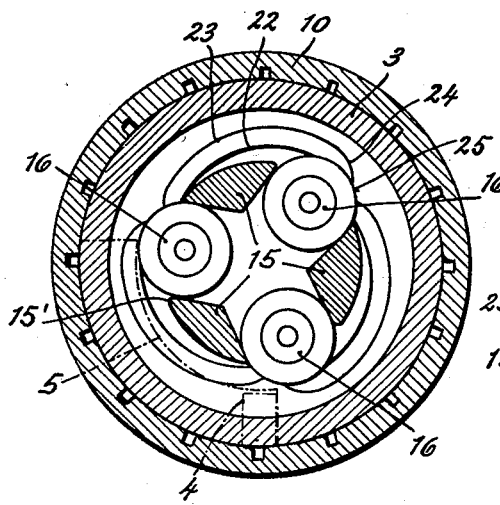

Fig. 1 is a longitudinal section of the two-stage quick-changing chuck, taken on the line I—I of Fig. 2, Fig. 2 shows a transverse section taken on the line II—II of Fig. 1, Fig. 3 is a further transverse section taken on the line III—III of Fig. 1, Figs. 4 and 5 represent each a fragmentary longitudinal section according to Fig. 1, with some parts in changed position, Fig. 6 is a transverse section taken on the line VI—VI of Fig. 4,

2

Figure 7:
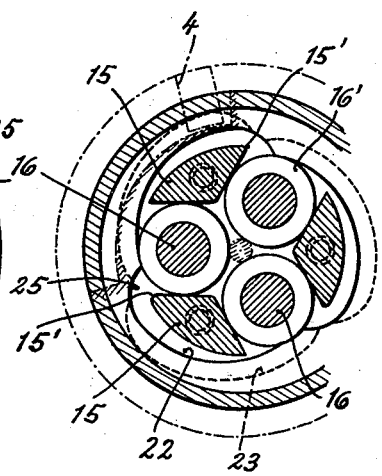

Fig. 7 is a transverse section taken on the line VII—VII of Fig. 5.

In the embodiment shown, numeral 1 designates a central carrier having a tapered bore to receive the bottom end 2 of a conical drilling spindle. Rotatably supported on carrier 1 is a hollow cylinder 3. The angle through which the cylinder 3 can be turned relative to the carrier 1 is limited by a pin 4 anchored in cylinder 3 and by a segmental recess 5 provided in said carrier. As viewed in Figs. 1, 4 and 5, the height of the recess 5 in longitudinal direction of the chuck is dimensioned greater than the diameter of the pin 4 so as to permit displacement of cylinder 3 also axially within certain limits relative the carrier 1. Wound round a neck 6 of the carrier 3 is a spiral spring 7 which at one end is secured at 8 in cylinder 3 and at the other at 9 in carrier 1, said spring being so arranged as to tend to turn the cylinder 3 in the direction of the arrow A indicated in Fig. 2, holding thereby the pin 4 at one end of the recess 5 in the position shown in Fig. 2.

On cylinder 3 a shell or collar 10 is rotatably supported, being retained against axial displacement relative to cylinder 3, at one end by a shoulder 11 of cylinder 3 and at the other by a safety ring 12 arranged in an annular groove thereof. The shell 10 preferably consists of some plastic material, say, of synthetic resin. To increase the plastic yielding, the shell 10 on its inner side is provided with a series of grooves 13 extending in the longitudinal direction of the chuck.

At the open end, the carrier 1 provides three radial ways 14 displaced by 120 angular degrees from one another, whereby three jaws 15 are formed which together constitute a cage for three clamping rollers 16 radially displaceable in the ways 14. The rollers 16 are provided with alternate depressions so as to form radially projecting collars 16'. At the bottom of the chuck, a cover 17 serving to secure the axial position of the rollers 16 is attached by screws 18 to the jaws 15 of the carrier. The radial inward shift of the clamping rollers i. e. towards the rotary axis of the chuck, is at one end confined by pins 20 each engaging a bore 19 of the rollers, and at the other end by recesses 21 made in the cover 17. Within the range of the roller 16, the cylinder 3 has inside three curved faces 22, whose centers of curvature are non-coaxial to the rotary axis of the chuck. In these curved faces, grooves 23 are uniformly spaced from each other to receive the roller collars 16'. At the ends remote from the rotary axis of the chuck, the grooves 23 each go over into a control face 24 which in rising towards the curved faces run out in these to form a seat 25 at these places.

Fig. 3 shows the clamping rollers in their radial extreme position to take a drill shaft of great diameter (shown in broken line). The spiral spring 7 tends to turn the cylinder 3 relative to the carrier 1 in the direction of the indicated arrow A. Thereby due to the action of the curved faces 22 the rollers 16 are forced inwards radially towards the drill shaft. Since the curved faces have rises with respect to the rotary axis of the chuck, the clamping pressure of the spiral spring 7 does not act properly in radial direction upon the rollers, but encloses in its pressing direction an acute angle together with the radial line extending through the roller center, said angle being so dimensioned that its tangent is smaller than the coefficient of friction between cylinder 3 and rollers. Thereby a self-locking frictional engagement is effected between cylinder 3 and rollers so that the reaction of the clamping pressure lying on the tool shaft is unable to turn the cylinder back for opening; the drill shaft remains clamped between the rollers 16 and is driven friction-tight with the rotary chuck.

On inserting a drill into the chuck, whose diameter of the shaft is somewhat smaller than that shown in Fig. 3, then the curved faces 22 bear against the clamping rollers rather in the centre of the curve, i. e. on the rear ends which are nearer to the rotary axis. The gripping range corresponds exactly to the double value of the rise of the curved faces between the point which lies nearest the rotary axis and the most remote one.

If it is required to grip a shaft of smaller diameter, the chuck must be changed over to the second stage. To this end the operator grasps the shell 10 of the rotary chuck by hand, arrests it and compresses it a little, whereby the shell 10 becomes deformed and exerts a braking action onto the cylinder 3. By this braking action the cylinder 3 is retained relative the carrier 1, whereby the rollers 16 by reason of the centrifugal force acting upon them, first take their extreme position as in Fig. 3, the rollers with their small diameter $d$ rolling off the curved faces 22. In the extreme position as visible in Fig. 3, the rollers thrust by their collars 16' against the control faces 24 of the grooves 23. Upon further additional braking pressure exerted onto the shell 10, the cylinder 3 is turned farther backwards relative to the carrier 1, i. e. in the direction contrary to arrow A. Thereby the rollers are moved inwards radially by the rising control faces 24 so as to cause the roller collars 16' to come out of the grooves 23. This movement continues till the pin 4 comes to rest at one end of the recess 5 as shown by broken line in Fig. 6. In this position the roller collars 16' are entirely clear of the grooves 23 and lie on the seatings 25. In this position of the rollers, the cylinder 3 is moved downwards due to a pulling action exerted on the shell 10 in the direction of arrow B indicated in Fig. 5, till the pin 4 meets the lower limiting face of the recess (Fig. 5). Thus the rollers bear no longer against the curved faces 22 with their small diameter $d$, but with the large one of its collars 16'. Then upon release of the braking shell 10, the consequent action of the spring 7 causes the cylinder 3 to precede the motion of the carrier 1 in the direction of arrow A, whereby the rollers are shifted inwards radially by the curved faces 22 as shown in Fig. 7. According to the diameter of the drill shaft the clamping rollers are stopped at an intermediate position between the two limit positions illustrated in Figs. 6 and 7, being thus, as described above, forced against the drill shaft, holding same friction-tight.

When the cylinder 3 is being braked, an unintentional change of the rollers from the extreme limit position of the gripping range shown in Fig. 3 over to that in Fig. 3 is prevented in that the pressure D (Fig. 3) exerted by the jaws 15 upon the rollers 16 does no longer act tangentially, but somewhat outwards. This is accomplished in the embodiment shown in that the edges of the jaws 15 which thrust against the rollers are each flattened at 15' so that the radius of the pressure point $R_1$ is a little smaller than the roller radius R. Thus a radial pressure component $D_1$ is produced which tends to push the rollers outwards radially. Only when upon stronger compression on the brake shell 10 this radial pressure component is overcome by the counterpressure of the control face 24, the rollers are caused to ride on the control faces, to be eventually changed over into the position as in Fig. 6, in which the rollers are retained by the arresting bolt 4 which abuts on one end of the recess 5.

What I claim is:

1. A chuck comprising: a carrier and a holder mounted for limited spiral adjustability with respect to each other; a plurality of longitudinal rollers each eccentrically mounted within the holder so as mutually to engage a drill shaft between them; and means for altering the mutual displacement of the rollers in response to spiral movement between the carrier and holder so as to engage drill shafts of varied diameter.

2. A chuck comprising: a carrier; a tubular, open-ended holder secured to the carrier for limited spiral movement thereabout, the inner face of said holder being formed with a plurality of longitudinal, peripherally directed arcuate faces, each having a series of arcuate, peripheral grooves, axially spaced apart therein; a guide pin transversely connecting the chuck and holder, being fixedly attached at one end and having its other end slidingly disposed in a spiral groove formed along the interface of the carrier and holder; a coil spring resiliently connecting the carrier and holder; and a plurality of longitudinal rollers, corresponding in number to the arcuate faces within the holder, mounted eccentrically for rotation thereagainst and adapted jointly to engage a drill shaft between them, said rollers individually having a series of peripheral shoulders axially spaced apart and adapted to seat selectively in the corresponding grooves of the holder and being displaceable to and from the grooves upon spiral movement of the carrier and holder in relation to each other.

3. The chuck of claim 2 which additionally contains a manually-engageable, brake collar of elastically deformable material, rotatably mounted on said holder.

4. A chuck comprising: a carrier; a tubular, open-ended holder secured to the carrier for limited spiral movement thereabout, the inner face of said holder being formed with a plurality of longitudinal, peripherally directed arcuate faces, each having a series of arcuate, peripheral grooves, axially spaced apart therein; a plurality of longitudinal rollers, corresponding in number to the arcuate faces within the holder, mounted eccentrically for rotation thereagainst and adapted jointly to engage a drill shaft between them, said rollers individually having a series of peripheral shoulders axially spaced apart and adapted to seat selectively in the corresponding grooves of the holder and being displaceable to and from the grooves upon axial movement of the carrier and holder in relation to each other; and means for effecting axial displacement of the carrier and holder in relation to each other.

ROBERT WEISS.

REFERENCES CITED

The following references are of record in the file of this patent:

UNITED STATES PATENTS

| Number | Name | Date |
| --- | --- | --- |
| 834,492 | Rothenbucher | Oct. 30, 1906 |
| 856,699 | Heynau | June 11, 1907 |